United States Patent Office 3,328,418
Patented June 27, 1967

3,328,418
3,5-DIOXOPYRAZOLIDINE DERIVATIVES
Václav Musil, Bohumila Brůnová, Oldřich Němeček, and Zdeňka Horáková, all of Prague, Czechoslovakia, assignors to Spofa, Sdruzeni podniku pro zdravotnickou vyrobu, Prague, Czechoslovakia
No Drawing. Filed Dec. 16, 1963, Ser. No. 330,573
Claims priority, application Czechoslovakia, Dec. 19, 1962, 7,129/62
5 Claims. (Cl. 260—310)

The invention relates to new derivatives of 3.5-dioxopyrazolidine of the general Formula I, and to the method of preparing same. The formula is:

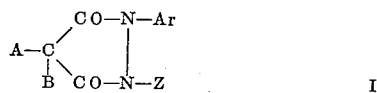

I wherein A stands for a group

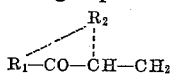

wherein $R_1$ is an alkyl with 1–4 carbon atoms, phenyl, substituted phenyl, or aralkyl, and $R_2$ is hydrogen or a carbon chain, as the case may be interrupted by a single or more heteroatoms, linked together with the $R_1$ residue to an alicyclic or heterocyclic ring, B is hydrogen, or an additional group A, alkyl with 1–4 carbon atoms, carboxyalkyl group, or cation of an inorganic or organic base, Z is hydrogen, alkyl with 1–4 carbon atoms or aryl, whether unsubstituted or substituted, and Ar is phenyl.

The substances of the above identified type, corresponding to the general Formula I, show antiinflammatory and analgetic properties, and compared with known 4-alkyl-1.2-diphenyl-3.5-dioxo pyrazolidines are noted for a substantially lower toxicity and better tolerance.

According to the literature, the 3.5-dioxo pyrazolidine derivatives substituted in the position 4 by a substituent comprising a keto group, can be obtained by several methods. For example, there was described the preparation of 1.2-diphenyl-3.5-dioxo-4-(3'-oxobutyl)-pyrazolidine by hydrolytic splitting off hydrogen chloride from the corresponding chlorocrotyl derivative. Another method consists in addition of methylvinyl ketone to 1.2-diphenyl-3.5-dioxo pyrazolidine. One may also start from ethyl γ-(ethylenedioxy)-butyl malonate, which is condensed with hydrazobenzene to form γ-ethylenedioxyphenyl butazone, and the latter split to 1.2-diphenyl-3.5-dioxo-4-(3'-oxobutyl)pyrazolidine by boiling with acetone in the presence of p-toluene-sulfonic acid (Helv. Chim. Acta 40, 402, 1957).

Said preparation methods can be applied to preparation of a very limited number of substances only; in a series of cases they are failing completely.

It has now been found that 3.5-dioxo pyrazolidine derivatives of the general Formula I can be easily prepared by a method constituting the essence of the present invention, and consisting in that a 3.5-dioxo-pyrazolidine of general Formula II:

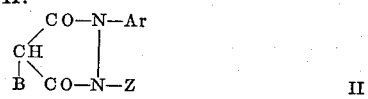

II wherein B, Z, and Ar stand for the same as in the Formula I, is reacted with a compound of general Formula III:

III wherein A has the same definition as in the Formula I, $R_3$ and $R_4$ are alkyls with 1–4 carbon atoms, forming as the case may be a heterocyclic ring, and possibly comprising still additional heteroatoms, $R_5$ is an alkyl with 1–4 carbon atoms or aralkyl, and X is anion of an inorganic acid.

The reaction can be carried out preferably in the medium of a solution of an alkali metal alcoholate in absolute alkanol with 1–4 carbon atoms, and at the temperature of the boiling point of the reaction mixture.

Essentially, the Mannich-Robinson reaction is utilized in the method of the present invention. From a pertinent ketone the Mannich base is first prepared, which is then quaternized e.g. with an alkyl halide or dialkyl sulfate, especially methyl iodide or diethyl sulfate, to form a compound of the general Formula III, which is finally condensed with a derivative of 3.5-dioxo pyrazolidine of the general Formula II.

The method according to the invention can be realized by two kinds of processes: In the first one the free Mannich base is prepared from its corresponding salt in the medium of an alcoholic solution of an alkali metal alcoholate, an alcoholic solution of a salt of a 3.5-dioxo pyrazolidine derivative of the general Formula II is added, whereupon to the boiling mixture the alcoholic solution of the quaternizing agent, e.g. dimethyl sulfate, is added. The reaction is completed by several hours boiling under reflux, and the reaction product is isolated in an usual manner, e.g. by evaporating the reaction mixture to dryness, extracting the dry residue with aqueous solution of an alkali metal hydroxide, and acidifying the thus obtained extract.

In the second kind of process a solution of a salt of 3.5-dioxo pyrazolidine derivative of the general Formula II is mixed at room temperature with freshly prepared quaternary salt of the general Formula III, and the reaction is completed by boiling the mixture under reflux for several hours. The product is then isolated analogically to the preceding case.

This process can be further modified in that the reaction is carried out instead with the use of a solution of the quaternary salt directly with the salt itself in crystalline condition, adding it to the solution of the 3.5-dioxo pyrazolidine derivative of the general Formula II.

The following examples may serve to illustrate the embodiment of the invention, without any limitation to them.

EXAMPLES

1.—*1.2-diphenyl-3.5-dioxo-4-(3.oxo-3-phenyl-propyl) pyrazolidine*

23.5 g. dimethylaminopropiophenone hydrochloride is dissolved in 200 ml. absolute methanol, and the base liberated by addition while stirring of a solution of 2.5 g. sodium in 70 ml. absolute methanol. Meanwhile 25.2 g. of 1.2-diphenyl-3.5-dioxo-pyrazolidine is dissolved in 170 ml. methanol, in which first 2.5 g. sodium has been dissolved. The hot and clear solution of the 1.2-diphenyl-3.5-dioxo pyrazolidine sodium salt thus formed is poured into the liberated Mannich base, and the mixture heated to the boil. To the boiling reaction mixture, during 0.5 hour under good stirring, a solution of 13.8 g. dimethyl sulfate in 70 ml. absol. methanol is dropwise added. The reaction mixture is then boiled under stirring for further 6–8 hours, cooled down, filtered and evaporated to dryness, the residue extracted with 500 ml. of an about 2% NaOH solution at a temperature of 60–70° C. It is allowed to cool down, filtered with charcoal, and the clear filtrate is acidified with 10% hydrochloric acid, whereby the desired substance is precipitated. The yield of the crude product is 22.7 g. On recrystallization from ethanol, or chloroform-cyclohexane mixture, it has M.P. 172–173° C.

2.—1.2-diphenyl-3.5-dioxo-4-(2-oxocyclohexylmethyl) pyrazolidine 40.4 g. of 1.2-diphenyl-3.5-dioxo pyrazolidine is dissolved in 200 ml. absolute methanol, in which the equivalent amount of sodium has been first dissolved. Meanwhile 36.0 g. of 2-dimethylaminomethylcyclohexanone is dissolved in 120 ml. absolute methanol, and is quaternized at a temperature of −5° C. by dropwise addition of a solution of 29.2 g. dimethyl sulfate in 50 ml. methanol. Into the solution of 2-dimethylaminomethylcyclohexanone methosulfate thus formed the solution of the pyrazolidine sodium salt is poured in one, heated while stirring to the boil, and boiled for 6–8 hours. After cooling down it is filtered, the filtrate evaporated to dryness, and the residue extracted at 40° C. with an about 3% NaOH solution, and further processed likewise as in Example 1. The yield of the crude product is 46.0 g. By recrystallization from a chloroform-cyclohexane mixture or ethanol a product with M.P. 142–143° C. is obtained.

3.—1.2-diphenyl-3.5-dioxo-4-antipyrylmethyl pyrazolidine

To a solution of 1.15 g. sodium in 100 ml. absolute methanol 12.6 g. of 1.2-diphenyl-3.5-dioxo pyrazolidine is added. Into the solution thus obtained 18.0 g. of solid dimethylaminomethylantipyrine methoiodide is poured in one under stirring. The suspension formed is heated while stirring to the boil, whereat a clear solution is obtained. It is boiled under stirring altogether for 6 hours, then cooled down, filtered, the filtrate evaporated to dryness, and the residue dissolved in about 300 ml. hot water. The solution is filtered with charcoal, and the clear filtrate acidified with 10% hydrochloric acid. By recrystallization from ethanol 9.0 g. of pure product with M.P. 173° C. is obtained.

4.—1.2-diphenyl-3.5-dioxo-4-[3-oxo-3-(o-hydroxyphenyl)-propyl]pyrazolidine.

25.3 g. of o-hydroxydimethylaminopropiophenone hydrochloride is dissolved under mild warming in 170 ml. absolute methanol, a solution of 2.5 g. sodium in 50 ml. absol. methanol is added and after cooling down the mixture to 0° C. 13.8 g. dimethyl sulfate in 50 ml. absol. methanol is dropwise added, and cooling continued to not allow the temperature to exceed 2° C. After all the dimethyl sulfate is added, the mixture is stirred for 0.5 hour at +2° C., and then allowed to stand at room temperature. To the solution of the quaternary salt thus formed a solution of 25.2 g. of 1.2-diphenyl-3.5-dioxo pyrazolidine on 170 ml. absol. methanol is added, in which the equivalent amount of sodium has been first dissolved. The mixture is first stirred for 1 hour at room temperature, and then boiled for 6–8 hours. It is allowed to stand overnight, and the next day the eliminated solid substance is sucked off, and the filtrate evaporated to dryness. The residue is warm treated with 400 ml. of about 5% NaOH solution, filtered, decolorized with charcoal, and the desired product liberated by means of 10% hydrochloric acid. By recrystallization from ethanol or chloroform-cyclohexane mixture, 17.8 g. of the substance with M.P. 152–153° C. is obtained.

5.—1.2-diphenyl-3.5-dioxo-4-(3-oxo-n-butyl) pyrazolidine 25.2 g. of 1.2-diphenyl-3.5-dioxo pyrazolidine is dissolved in 300 ml. methanol, in which, 2.5 g. sodium has been first dissolved. After complete dissolution 17.1 g. 4-(1-piperidino)-2-butanone is added, the solution heated to the boil, whereupon during 0.5 hour 11 ml. dimethyl sulfate in 70 ml. methanol is dropwise added. The mixture is boiled under stirring for further 5 hours. After cooling down it is sucked off, the filtrate evaporated to dryness, and the residue extracted with a solution of 6 g. NaOH in 300 ml. water at 60° C. The alkaline solution is decolorized with charcoal, and the clear filtrate acidified with 10% hydrochloric acid. The oil eliminated changes within a short while to a crystalline mass. Yield is 10.5 g. the substance on recrystallization from ethanol has M.P. 120° C.

6.—1.2-diphenyl-3.5-dioxo-4-[3-(4′-chlorophenyl)-3-oxopropyl]pyrazolidine 27.3 g. of 4-chlorodimethylaminopropiophenone hydrochloride is dissolved in 250 ml. absolute methanol, and the base is liberated by means of a sodium methylate solution prepared in dissolving 2.5 sodium in 70 ml. methanol. It is stirred for 15 min. Meanwhile 25.2 g. of 1.2-diphenyl-3.5-dioxo pyrazolidine is dissolved in a solution of 2.5 g. sodium in 170 ml. methanol, and this solution is poured in one to the solution of the Mannich base. The reaction mixture is heated to the boil, and during about 30 min. a solution of 13.8 g. dimethyl sulfate in 70 ml. methanol is dropwise introduced. The mixture is boiled under reflux for 7 hours. After cooling down it is filtered and the filtrate evaporated to dryness. The residue is extracted with 3–5% NaOH solution. The alkaline extract is decolorized with active charcoal, and the product liberated by acidification with dilute hydrochloric acid (1:1). Yield is 24.0 g. On recrystallization from ethanol, chloroform-cyclohexane mixture, or cyclohexane, the product has M.P. 136–137° C.

We claim:
1. 1.2-diphenyl - 3.5 - dioxo-4-(3-oxo-3-phenyl-propyl) pyrazolidine.
2. 1.2-diphenyl - 3.5 - dioxo-4-(2-oxocyclohexylmethyl) pyrazolidine.
3. 1.2-diphenyl - 3.5 - dioxo-4-antipyrylmethyl pyrazolidine.
4. 1.2-diphenyl - 3.5 - dioxo-4-[3-oxo-3-(o-hydroxyphenyl)-propyl]pyrazolidine.
5. 1.2-diphenyl - 3.5 - dioxo-4-[3-(4′-chlorophenyl)-3-oxopropyl]pyrazoline.

References Cited

UNITED STATES PATENTS 2,773,880  12/1956  Ctvrtnik et al. _____ 260—310
3,123,616  3/1964  Mayer et al. _____ 260—310

OTHER REFERENCES

Blicke in Adams et al.: Organic Reactions, vol. 1, pp. 320–22, New York, Wiley, 1952.

Denss et al.: German application 1,038,049, printed September 1958.

Jacobs in Elderfield: Heterocyclic Compounds, vol. 5, p. 148, New York, Wiley, 1957.

Khaletskii et al.: Russian Chemical Reviews, vol. 32, pp. 542–546 (October 1963).

Molho: Bul. Soc. Chim., France, 1961, pp. 1417–24 (1961).

JOHN D. RANDOLPH, Primary Examiner.

WALTER T. MODANCE, Examiner.

N. TROUSOF, Assistant Examiner.